United States Patent [19]

Lee

[11] Patent Number: 5,757,558
[45] Date of Patent: May 26, 1998

[54] IMAGING SYSTEM WITH RECTIFYING MASK

[75] Inventor: Che-Di Lee, Taipei Hsien, Taiwan

[73] Assignee: E-Lux, Inc., Taiwan

[21] Appl. No.: 883,940

[22] Filed: Jun. 27, 1997

[51] Int. Cl.⁶ .................................................. G02B 9/04
[52] U.S. Cl. ................ 359/793; 359/798; 359/663; 396/89; 362/297; 250/548
[58] Field of Search .................... 359/663, 793, 359/794, 798, 800; 396/89; 362/297; 250/548

[56] References Cited

U.S. PATENT DOCUMENTS

| | | | |
|---|---|---|---|
| 4,943,733 | 7/1990 | Mori et al. | 250/548 |
| 5,046,837 | 9/1991 | Sroomer et al. | 362/297 |
| 5,193,124 | 3/1993 | Subbarao | 396/89 |
| 5,424,877 | 6/1995 | Tsuyuki et al. | 359/663 |

Primary Examiner—Loha Ben
Attorney, Agent, or Firm—Sheridan Ross, P.C.

[57] ABSTRACT

The optical unit of an imaging system is disposed between a target object and an image plane, and permits the passage of cones of light from different point sources on the target object therethrough to form an image on the image plane. The optical unit is provided with an aperture stop to control sizes of the cones of light passing through the optical unit. The aperture stop forms an entrance pupil in relation to the optical unit. A rectifying mask, which is formed as an upright opaque plate, is disposed between the target object and the image plane. The aperture stop forms a corresponding aperture stop image on a plane of the rectifying mask, and the rectifying mask has a mask width which is narrower than the width of the corresponding aperture stop image, and a mask height which is greater than the mask width. The rectifying mask or a mask image thereof as formed by the optical unit appears to shift relative to the entrance pupil such that the rectifying mask or the mask image thereof covers different areas of the entrance pupil when a center of the entrance pupil is viewed from the different point sources on the target object, thereby resulting in generally uniform illumination reduction at the image plane to compensate for the cosine-fourth law phenomenon.

7 Claims, 5 Drawing Sheets

IMAGING SYSTEM WITH RECTIFYING MASK

BACKGROUND OF THE INVENTION

1. Field of the Invention

The invention relates to an imaging system, more particularly to an imaging system with a rectifying mask to compensate for the cosine-fourth law phenomenon.

2. Description of the Related Art

In an imaging system, such as an optical scanner, it is noted that the illumination at the center of a resultant image is greater as compared to that at the edges of the same. FIG. 1 illustrates a conventional imaging system which includes a linear light source 10 that generates light rays through an optical unit 11 to obtain a resultant image 12. FIG. 2 illustrates a plot of the illumination ratio (E/EO) of the resultant image 12 versus the distance of points on the resultant image 12 from the optical axis. E is the illumination of the resultant image 12 at any point, while EO is the illumination of the resultant image 12 at the optical axis (distance x=0). $\Phi$ is the viewing angle, hi is the height of the resultant image 12, while si is the distance of the resultant image 12 from the optical unit 11. $\Phi$ is equal to $\tan^{-1}$ (½hi/si). $\theta$ is the angle of incidence and is equal to $\tan^{-1}$ (|x|/si).

From FIG. 2, it is known that illumination of the resultant image 12 at any point can be defined as a function of the expression $\cos^4\theta$. This phenomenon is known as the cosine-fourth law.

Correction of the cosine-fourth law is presently done in either of the following manners:

1. The brightness of the light source is corrected by partly shielding the intermediate portion of the light source so that illumination at the intermediate portion approximates that at the end portions, or by increasing the illumination at the end portions of the light source so as to approximate that at the intermediate portion. In either case, a substantial increase in the cost of the imaging system is encountered.

2. A mask is provided between the target object and the optical unit 11. As shown in FIG. 3, the mask 13 is disposed horizontally between the light source 10 and the optical unit 11, and has a width corresponding to the range of the viewing angle $\Phi$. The height of the mask 13 is varied gradually such that the intermediate portion thereof is higher than the end portions of the same. As such, more light passes through the end portions of the mask 13 as compared to the intermediate portion of the same so as to compensate for the cosine-fourth law phenomenon.

Unfortunately, mass production of the mask 13 involves injection molding from plastic material. It is difficult to obtain a mask 13 with a precise shape using this process. As such, the correcting efficiency of the conventional imaging system which uses the mask 13 is not too high.

SUMMARY OF THE INVENTION

Therefore, the object of the present invention is to provide an imaging system which employs a simple, inexpensive and precise rectifying mask to compensate for the cosine-fourth law phenomenon.

According to this invention, an imaging system is used to generate an image of an illuminated target object on an image plane and comprises: an optical unit adapted to be disposed between the target object and the image plane such that the optical unit, the target object and the image plane lie on an optical axis, the optical unit permitting passage of cones of light from different point sources on the target object therethrough to form the image on the image plane, the optical unit being provided with an aperture stop to control sizes of the cones of light passing through the optical unit, the aperture stop forming an entrance pupil in relation to the optical unit; and a rectifying mask formed as an upright opaque plate and adapted to be disposed on the optical axis between the target object and the image plane.

The aperture stop forms a corresponding aperture stop image on a plane of the rectifying mask. The rectifying mask has a mask width which is narrower than the width of the corresponding aperture stop image, and a mask height which is greater than the mask width. The rectifying mask or a mask image thereof as formed by the optical unit appears to shift relative to the entrance pupil such that the rectifying mask or the mask image thereof covers different areas of the entrance pupil when a center of the entrance pupil is viewed from the different point sources on the target object, thereby resulting in generally uniform illumination reduction at the image plane to compensate for the cosine-fourth law phenomenon.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENTS

Figure 1:
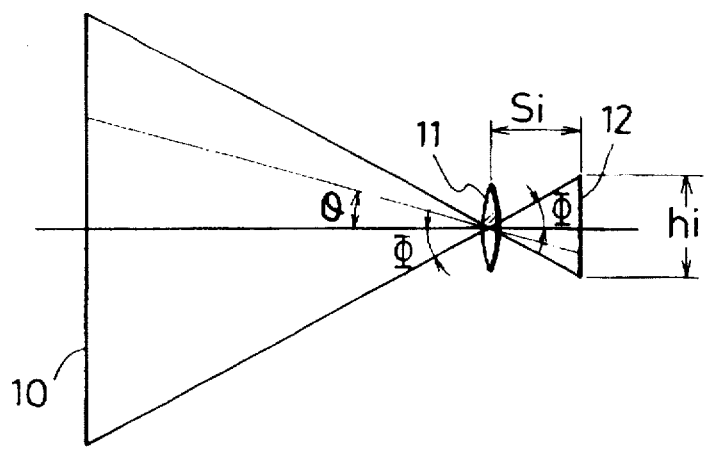
FIG. 1 is a schematic view of a conventional imaging system.
Figure 2:
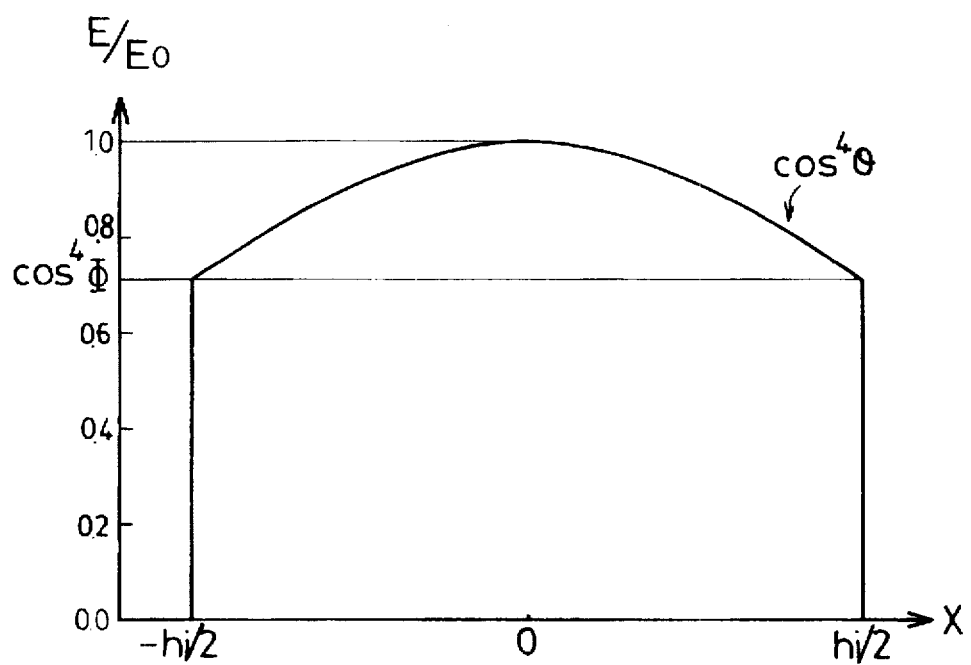
FIG. 2 illustrates a plot of the illumination ratio of a resultant image of FIG. 1 versus the distance of points on the resultant image from the optical axis.
Figure 3:
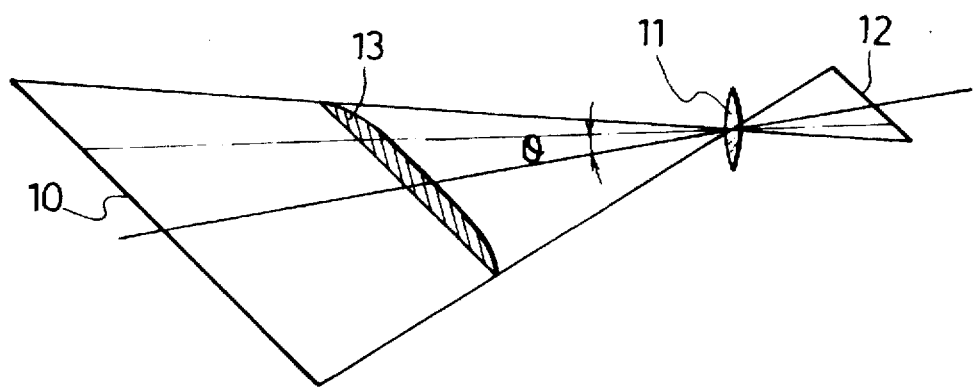
FIG. 3 is a schematic view of another conventional imaging system which employs a rectifying mask to compensate for the cosine-fourth law phenomenon.
Figure 4:
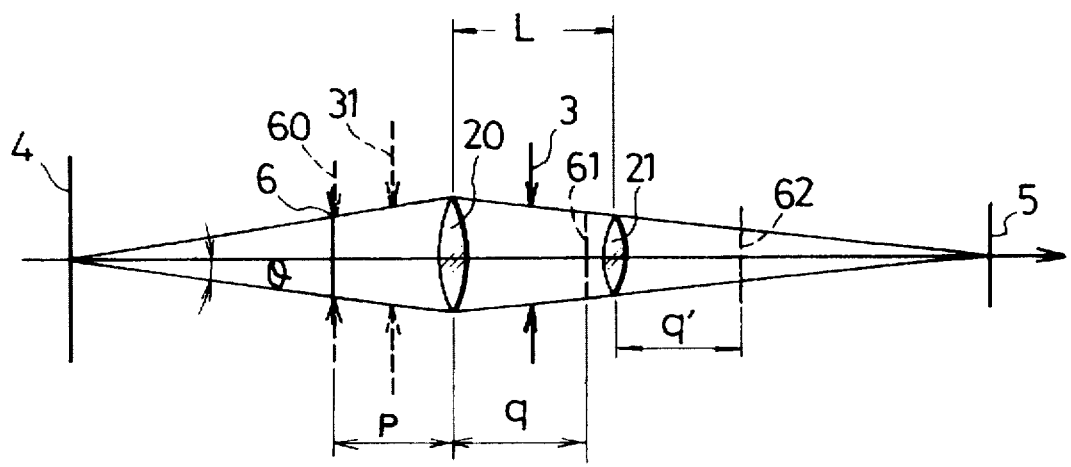
FIG. 4 is a schematic view of an imaging system with a cosine-fourth law rectifying mask according to the present invention.

Referring to FIG. 4, the imaging system of the present invention is used to generate an image of an illuminated target object 4 on an image plane 5 and comprises an optical unit and a cosine-fourth law rectifying mask 6. The optical unit is adapted to be disposed between the target object 4 and the image plane 5 such that the target object 4, the image plane 5 and the optical unit lie on an optical axis. The optical unit permits the passage of cones of light from different point sources on the target object 4, which is illuminated by a primary light source (not shown), therethrough to form a resultant image on the image plane 5 behind the optical unit. In this embodiment, the optical unit includes front and rear lenses 20, 21. It should be noted, however, that additional lenses may be provided between the front and rear lenses 20, 21 according to the system requirements. The optical unit further includes an aperture stop 3 to control sizes of the cones of light passing through the optical unit. In this embodiment, the aperture stop 3 is disposed between the front and rear lenses 20, 21. The aperture stop 3 may be circular, square, rectangular or triangular in shape. In this embodiment, the aperture stop 3 is circular in shape. Entrance pupil 31 is the image of the aperture stop 3 as it would be seen if viewed from the target object 4 at the optical axis.

The rectifying mask 6 is formed as an upright opaque plate which, in this embodiment, is disposed on the optical axis between the front lens 20 and the target object 4. In this embodiment, the rectifying mask 6 is rectangular in shape to complement the circular shape of the aperture stop 3, and has a mask height which is greater than a mask width thereof. When the center of the entrance pupil 31 is viewed from the different point sources on the target object 4, the rectifying mask 6 appears to shift relative to the entrance pupil 31 under different angles of observation such that the rectifying mask 6 covers different areas of the entrance pupil 31. Thus, uniform illumination reduction can be attained as the cones of light from the target object 4 pass through the optical unit to form the image at the image plane 5. Therefore, compensation for the cosine-fourth law phenomenon can be achieved with the use of the rectifying mask 6 according to this invention. Determination of the dimensions of the rectifying mask 6 and the position of the rectifying mask 6 relative to the target object 4 will be described in greater detail in the succeeding paragraphs.

Figure 5:
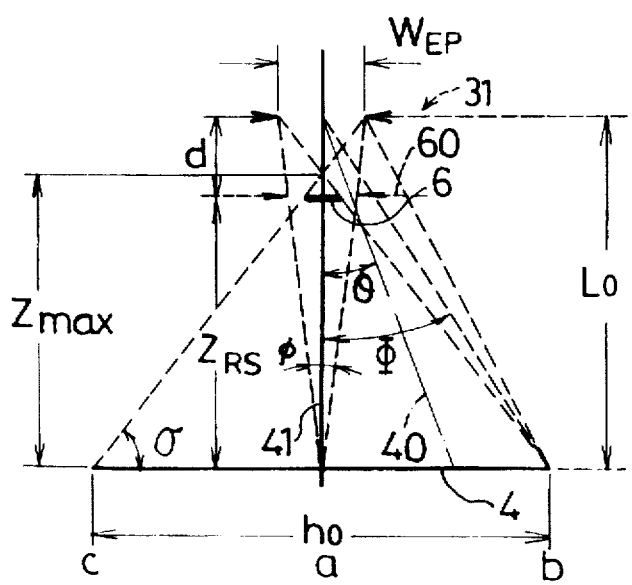
FIG. 5 is a schematic view illustrating the relationship among a target object, a rectifying mask and an entrance pupil in accordance with the first preferred embodiment of the present invention.

Proof that the rectifying mask 6 is capable of compensating for the cosine-fourth law phenomenon will now be described hereinafter with reference to FIG. 5 and to FIGS. 6, 7 and 8, which illustrate the relationship between the rectifying mask 6 and a corresponding aperture stop image 60 at the plane of the rectifying mask 6 under different angles of incidence θ. As shown, the mask width of the rectifying mask 6 is narrower than the width of the corresponding aperture stop image 60, and the mask height is sufficient such that the top edge of the rectifying mask 6 is at least level with the topmost portion of the corresponding aperture stop image 60. In FIG. 5, d is the distance between the entrance pupil (EP) 31 and the rectifying mask (RS) 6, while $Z_{RS}$ is the distance between the rectifying mask 6 and the target object 4. The angle of incidence θ is the angle formed between a chief ray 40 and the optical axis 41. As mentioned beforehand, a point source on the target object 4 generates a cone of light that passes through the entrance pupil 31. The chief ray 40 is the ray of the cone of light which passes through the center of the entrance pupil 31. φ is the angle formed between two diametrically opposite rays of a cone of light from a point source of the target object 4 at the optical axis 41 and which barely pass through the periphery of the entrance pupil 31.

Figure 6:
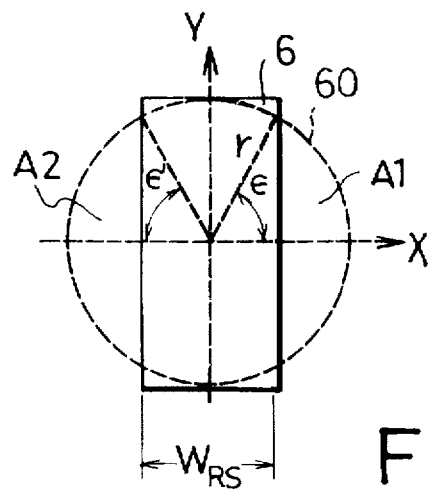
FIGS. 6 to 8 illustrate the shifting effect of the rectifying mask of the present invention at different angles of incidence.

Referring to FIGS. 5 and 6, $r=Z_{RS}\cdot\tan\frac{1}{2}\phi$. When $0<\theta<\tan^{-1}(\frac{1}{2}W_{RS}/d)$, wherein $W_{RS}$ is the width of the rectifying mask 6, the areas A1, A2 can be calculated as follows:

$$A1=\frac{1}{2}\pi r^2-[(r^2 \sin\epsilon \cos\epsilon)+r^2(\frac{1}{2}\pi-\epsilon)]$$

$$A2=\frac{1}{2}\pi r^2-[(r^2 \sin\epsilon' \cos\epsilon')+r^2(\frac{1}{2}\pi-\epsilon')]$$

The total light transmittable area A is equal to the sum of A1 and A2.

Figure 7:
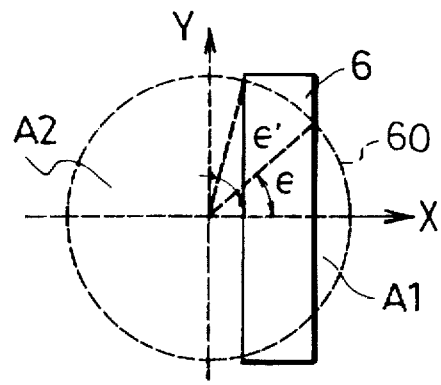

Referring to FIGS. 5 and 7, when $$\tan^{-1}(\frac{1}{2}W_{RS}/d)<\theta<\tan^{-1}[(r-\frac{1}{2}W_{RS})/d],$$

the areas A1, A2 can be calculated as follows:

$$A1=\frac{1}{2}\pi r^2-[(r^2 \sin\epsilon \cos\epsilon)+r^2(\frac{1}{2}\pi-\epsilon)]$$

$$A2=\frac{1}{2}\pi r^2+[(r^2 \sin\epsilon' \cos\epsilon')+r^2(\frac{1}{2}\pi-\epsilon')]$$

The total light transmittable area A is equal to the sum of A1 and A2.

Figure 8:
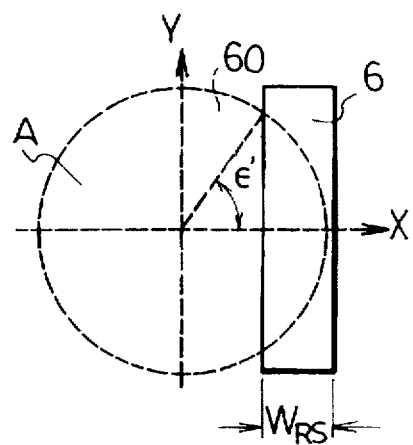

Referring to FIGS. 5 and 8, when $$\tan^{-1}[(r-\frac{1}{2}W_{RS})/d]<\theta<\tan^{-1}[(r+\frac{1}{2}W_{RS})/d],$$

the light transmittable area A can be calculated as follows:

$$A=\pi r^2-|r^2\epsilon'-r^2 \sin\epsilon' \cos\epsilon')$$

Since the original aperture size is $\pi r^2$, the transmission ratio T is equal to $A/\pi r^2$. Considering the effect of the cosine-fourth law phenomenon, the illumination at any point Ei on the image plane 5 can be obtained as follows:

$$Ei=Eo\cdot T\cdot\cos^4\theta\cdot k$$

wherein Eo is the illumination of the target object 4, and k is a constant.

Figure 9:
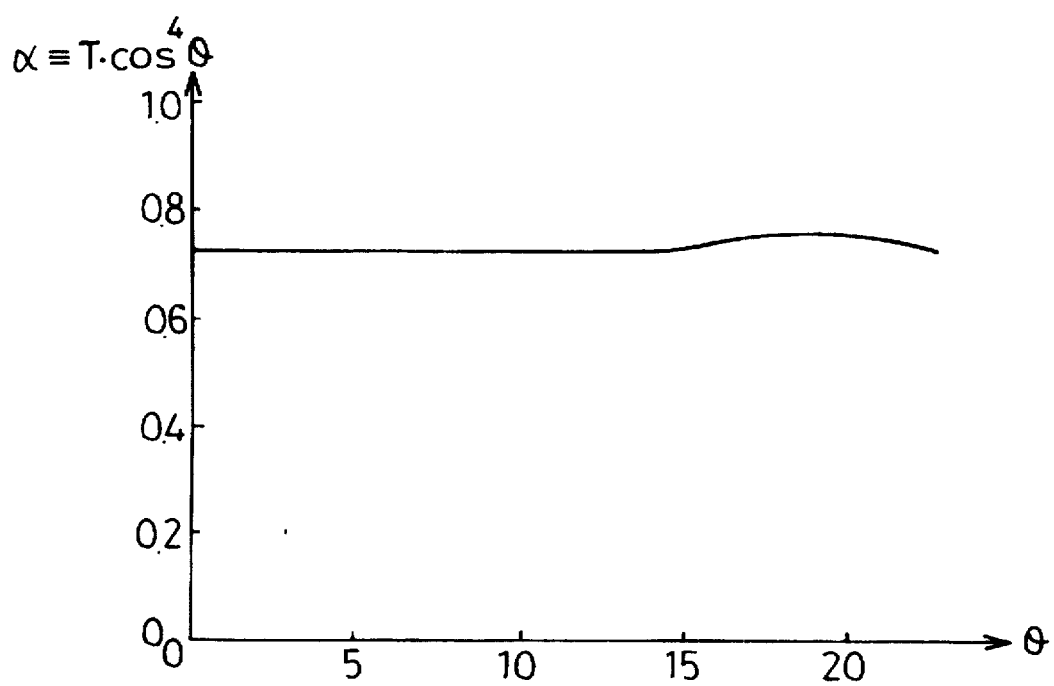
FIG. 9 is a graphical illustration of the relationship between the illuminance reduction factor and the angle of incidence for the first preferred embodiment.

FIG. 9 illustrates the relationship between an illuminance reduction factor α, which is equal to the product of the transmission ratio T and $\cos^4\theta$, and the angle of incidence θ when d=2.91 mm, r=1 mm, and $W_{RS}$=0.436 mm. The ratio between the largest and smallest values of α is 1.04. This is in contrast with an imaging system which does not incorporate a cosine-fourth law correction device, wherein the ratio between the largest and smallest values of α is equal to 1.38. From the foregoing, it can be seen that the presence of the rectifying mask 6 can provide adequate compensation to the reduced illumination due to the cosine-fourth law phenomenon.

Figure 10:
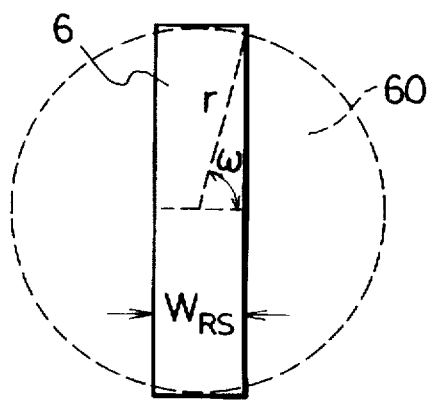
FIG. 10 illustrates the relationship between the rectifying mask and a corresponding aperture stop image when the angle of incidence is 0°.

Referring to FIGS. 5 and 10, using triangle formulas, the distance $Z_{RS}$ and the width $W_{RS}$ of the rectifying mask 6 can be calculated as follows:

Neglecting the effect of the rectifying mask 6, when the angle of incidence θ is equal to 0°, the light which is seen at the image plane 5 (see FIG. 4) comes from the point source a which lies on the optical axis at the target object 4. The size of the aperture stop 3 limits the amount of light that is transmitted to the image plane 5. Assuming that the size of the cone of light from the point source a at the plane of the rectifying mask 6 is $A_{EP}$, and that φ is very small, $$\tan\phi\approx\sin\phi\approx W_{EP}/Lo\approx\phi, \text{ and } r=Z_{RS}\cdot\tan\frac{1}{2}\phi.$$

Thus, $$A_{EP}=(Z_{RS}\cdot W_{EP}/Lo\cdot\frac{1}{2})=\pi r^2.$$

Note that the illuminance reduction factor α should be equal when θ=0 and θ=Φ=$\tan^{-1}\frac{1}{2}ho/Lo$, wherein ho is the height of the target object 4, and Lo is the distance of the entrance pupil 31 from the target object 4. The position of the rectifying mask 6 is selected such that, when θ=Φ, the rectifying mask 6 allows complete passage of the cones of light, at two of the point sources b, c disposed respectively on opposite ends of the target object 4 distant from the optical axis, to the image plane 5 via the entrance pupil 31. Thus, T (θ=Φ)=1. From FIG. 5, the following equation can be obtained:

$\cot \sigma = \frac{1}{2} W_{RS}/(Z_{max} - Z_{RS})$

As such, $$W_{RS} = 2(Z_{max} - Z_{RS}) \cot \sigma \qquad \text{(Eq. 1)}$$

wherein $$Z_{max} = Lo \cdot ho/(ho + W_{EP}),$$

and $\cot \sigma = \frac{1}{2} ho/Z_{max}.$

Referring to FIG. 10, since $$\alpha = T(\theta=0) = T(\Phi) \cdot \cos^4 \Phi = \cos^4 \Phi,$$

the area $A_{RS}$ covered by the rectifying mask 6 when the angle of incidence $\theta=0°$ is $$A_{RS} = [W_{RS} \cdot \frac{1}{2}(r+r \sin W)] \cdot 2 = W_{RS} \cdot r(1+\sin w)$$

wherein $r = Z_{RS} \cdot \tan (\phi/2) = Z_{RS} \cdot W_{EP}/2Lo,$ and $\sin w = [1-(\frac{1}{2} W_{RS})^2/r^2]^{1/2}.$ Therefore, $$T = 1 - A_{RS}/A_{EP} = 1 - W_{RS} \{1 + [1-(\frac{1}{2}W_{RS})^2/r^2]^{1/2}\}/(Z_{RS} \cdot W_{EP}/2Lo \cdot \pi) = \cos^4 \Phi \qquad \text{(Eq. 2)}$$

From Equations 1 and 2, the width $W_{RS}$ and the distance $Z_{RS}$ can be obtained as follows:

By rearranging Equation 2, $$Z_{RS} \cdot W_{EP}/2Lo \cdot \pi (1-\cos^4 \Phi) = W_{RS} \{1 + [1-(W_{RS} \cdot Lo/(Z_{RS} \cdot W_{EP}))^2]^{1/2}\}$$

Assigning $Y = Z_{RS}/W_{RS},$
$K1 = W_{EP} \cdot \pi (1-\cos^4 \Phi)/2Lo,$ and
$K2 = W_{EP}/Lo$ into Equation 2,
$(K1Y-1)^2 = 1 - 1/(K2^2 Y^2)$
$K1^2 K2^2 Y^4 - 2K1K2^2 Y^3 + 1 = 0$ Selecting one of the four roots for Y, $Z_{RS} = Y W_{RS}$. Thereafter, Equation 1 can be rewritten as follows:

$$W_{RS} = 2Z_{max} \cdot \cot \sigma/(1 + 2r \cot \sigma)$$

From the foregoing, upon installing the rectifying mask 6 with a predetermined width $W_{RS}$ at a predetermined distance $Z_{RS}$ from the target object 4, the rectifying mask 6 can cover different areas of the entrance pupil 31 when the center of the latter is viewed from the different point sources on the target object 4, thereby achieving the effect of generally uniform illumination reduction as light from the target object 4 passes through the optical unit to compensate for the cosine-fourth law phenomenon.

Referring again to FIG. 4, the optical unit forms a mask image 61 of the rectifying mask 6 behind the front lens 20. The position of the mask image 61 can be obtained using the following equation:

$-1/P + 1/q = 1/f1$ wherein f1 is the focal length of the front lens 20, P is the distance of the rectifying mask 6 from the front lens 20, and q is the distance of the mask image 61 from the front lens 20. P and q use the front lens 20 as a reference point. Distances measured to the left of the reference point are positive, while those to the right of the reference point are negative. The focal length f1 is greater than 0 if the front lens 20 is a converging lens, and is less than 0 if the front lens 20 is a diverging lens.

The width $W'_{RS}$ of the mask image 61 is equal to the product of the width $W_{RS}$ of the rectifying stop 6 and a magnification factor M1 of the front lens 20, wherein $M1 = q/P$.

In another embodiment of an imaging system according to the present invention, a rectifying mask having a width WIRS and located at the mask image 61 between the front lens 20 and the image plane 5 is used instead of the rectifying mask 6 between the target object 4 and the optical unit. As such, the mask image of the new rectifying mask as formed by the optical unit appears to shift relative to the entrance pupil 31 under different angles of observation such that the new rectifying mask image still covers different areas of the entrance pupil 31. Thus, uniform illumination reduction can also be attained as the cones of light from the target object 4 pass through the optical unit via the entrance pupil 31 to form the image at the image plane 5, thereby resulting in compensation for the cosine-fourth law phenomenon.

The above calculations for the position and width of the mask image 61 of the rectifying mask 6 are valid only if no other lens is disposed between the front lens 20 and the mask image 61. In the example of FIG. 4, if the calculated position of the mask image 62 is disposed behind the rear lens 21, the effect of the rear lens 21 should be taken into consideration. The position of the mask image 62 is obtained using the following equation:

$-1/(q-L) + 1/q' = 1/f2$ wherein f2 is the focal length of the rear lens 21, L is the distance between the front and rear lenses 20, 21, and q' is the distance of the mask image 62 from the rear lens 21.

The width $W''_{RS}$ of the mask image 62 is equal to the product of the width $W_{RS}$ of the rectifying stop 6, the magnification factor M1 of the front lens 20, and a magnification factor M2 of the rear lens 21, wherein $M2 = q'/(q-L)$ The effect of a rectifying mask having a width $W''_{RS}$ and located at the mask image 62 between the rear lens 21 and the image plane 5 is the same as that described beforehand and will not be detailed further.

By utilizing the same approach employed in determining the mask image 61, another mask image (not shown) behind the rear lens 21 may be obtained. As such, another rectifying mask (not shown) can be designed for installation behind the rear lens 21 at the calculated mask image location. The effect of the new rectifying mask is the same as that described beforehand and will not be detailed further.

It has thus been shown that the rectifying mask used in the imaging system of the present invention can provide adequate compensation for the cosine-fourth law phenomenon, has a simple construction and can be manufactured in a relatively inexpensive manner without a high precision requirement. The object of the present invention is thus met.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. An imaging system for generating an image of an illuminated target object on an image plane, said imaging system comprising:

an optical unit adapted to be disposed between the target object and the image plane such that said optical unit, the target object and the image plane lie on an optical axis, said optical unit permitting passage of cones of light from different point sources on the target object therethrough to form the image on the image plane, said optical unit being provided with an aperture stop to control sizes of the cones of light passing through said optical unit, said aperture stop forming an entrance pupil in relation to said optical unit; and a rectifying mask formed as an upright opaque plate and adapted to be disposed on the optical axis between the target object and the image plane;

wherein said aperture stop forms a corresponding aperture stop image on a plane of said rectifying mask, said rectifying mask having a mask width which is narrower than the width of the corresponding aperture stop image, and a mask height which is greater than the mask width;

said rectifying mask or a mask image thereof as formed by said optical unit appearing to shift relative to the entrance pupil such that said rectifying mask or said mask image thereof covers different areas of the entrance pupil when a center of the entrance pupil is viewed from the different point sources on the target object, thereby resulting in generally uniform illumination reduction at the image plane to compensate for the cosine-fourth law phenomenon.

2. The imaging system of claim 1, wherein said rectifying mask is located at a predetermined distance from the target object such that said rectifying mask allows complete passage of the cones of light, at two of the point sources disposed respectively on opposite ends of the target object distant from the optical axis, to the image plane via the entrance pupil and such that said rectifying mask allows passage of only fractions of the cones of light, at central ones of the point sources of the target object adjacent to the optical axis, to the image plane via the entrance pupil.

3. The imaging system of claim 1, wherein said rectifying mask has a top edge which is at least level with a topmost portion of the aperture stop image.

4. The imaging system of claim 1, wherein said rectifying mask is adapted to be disposed between the target object and said optical unit.

5. The imaging system of claim 1, wherein said optical unit comprises front and rear lenses, said rectifying mask being disposed behind said front lens.

6. The imaging system of claim 5, wherein said aperture stop is disposed between said front and rear lenses.

7. The imaging system of claim 1, wherein said aperture stop is circular in shape, and said rectifying mask is rectangular in shape.

* * * * *